3,684,747
METHOD FOR INCREASING THE LIQUID ABSORPTIVE CAPACITY OF LINEAR FLUOROCARBON SULFONIC ACID POLYMER
Richard Leslie Coalson, Wilmington, Del., and Walther Gustav Grot, Chadds Ford, Pa., assignors to E. I. du Pont de Nemours and Company, Wilmington, Del.
No Drawing. Filed Apr. 22, 1970, Ser. No. 30,999
Int. Cl. C08f 47/08, 15/00, 29/16
U.S. Cl. 260—2.5 R                12 Claims

ABSTRACT OF THE DISCLOSURE

The liquid absorptive capacity of linear fluorocarbon sulfonic acid polymer is increased by contacting the polymer with a liquid swelling agent such as ethylene glycol at a temperature of at least 110° C. The resultant polymer has increased pore volume, enabling it to have an increased take-up capacity for liquids such as aqueous electrolytes which increases the electrical conductivity of the polymer making it especially useful for ion-exchange membranes in electrochemical cells. The resultant swollen polymer is thermally stable in the sense that after drying at 100° C., it retains a substantial proportion of its improved liquid absorptive capacity.

---

This invention relates to a method for increasing the liquid absorptive capacity of sulfonic acid-containing linear fluorocarbon polymers and to the resultant product.

The sulfonic acid groups impart water-wettability to the aforementioned polymers which result in a swelling or increase in the liquid absorptive capacity of the polymer. For some applications, this is a valuable attribute, e.g. the absorption of aqueous electrolyte by the polymer increases the electrical conductivity of the polymer. Heretofore, the polymer has been swollen by treatment with hot water at atmospheric pressure, but this has not always produced the liquid absorption capacity desired and in addition when the polymer was dried after swelling, the effect of the swelling treatment was essentially lost.

The present invention provides a method for further increasing the liquid absorptive capacity of linear fluorocarbon sulfonic acid polymers, the method comprising contacting the polymer with a liquid swelling agent at a temperautre of at least 110° C. In one embodiment, the swelling agent is used at a temperature above its atmospheric pressure boiling point but the contacting step is conducted under sufficient superatmospheric pressure to maintain the swelling agent in the liquid state. In another embodiment, the swelling agent has a boiling point at atmospheric pressure which is above 110° C. In still a further embodiment, excess pressure, i.e. pressures beyond that which is required to maintain the swelling agent in the liquid state, is used to even further increase the liquid absorptive capacity of the polymer. The degree of swelling described herein is measured by the liquid absorptive capacity of the polymer i.e. (weight of water absorbed by the polymer÷dry weight of the polymer)×100.

Not only do these embodiments increase the liquid absorptive capacity of the polymer over that which is obtained by soaking in water at 100° C. and atmospheric pressure, but the swelling of the polymer makes it undergo a structural change as evidenced by a substantial proportion of the liquid absorptive capacity of the polymer being retained after removal of the swelling agent and drying. In contrast, the increase in liquid absorptive capacity obtained by soaking the polymer in boiling water at 100° C. practically disappears upon drying and disappears altogether when the drying is done at 100° C. This has required the polymer to be kept in the "wet" form until use, whereas the retained increased liquid absorption capacity of polymer treated according to the present invention permits the convenience of the ability to store the treated polymer in the dry state prior to use.

The polymer swollen according to the present invention and after drying will exhibit at least 10 percent more absorptive capacity than the same polymer swollen at a temperature of no greater than 100° C. and then dried. The improvement before swelling is usually much greater than this, depending on the temperature above 110° C. and pressure used to obtain swelling. For example, a tenfold improvement in liquid absorptive capacity is obtainable using high soaking temperatures, e.g. 200° C. and high pressures, e.g. 352 kg./cm.$^2$. The amount of the improvement retained after drying of the polymer swollen according to the present invention will generally be at least 25 percent of the improvement in liquid absorptive capacity. This comparison is based on polymer of the same molecular and equivalent weights, swollen for the same amount of time, dried at 100° C. and thereafter tested for liquid absorptive capacity under the same conditions at a temperature of no greater than 100° C. It has been found that drying can be essentially completed in 30 minutes under a vacuum of 63 cm. of Hg at the drying temperature of 100° C. Heating at 100° C. beyond this time has little effect on the retained swollen nature of polymers swollen according to the present invention.

The polymers which can be swollen according to the method of the present invention are the fluorocarbon polymers containing sulfonic acid groups, i.e. the polymer has a fluorocarbon backbone and the sulfonic acid groups are pendant therefrom. The swelling phenomenon is believed to involve an affinity of the swelling agent for the sulfonic acid groups only, with the remainder of the polymer being inert to the swelling agent. Thus, it is desired that the polymer have an equivalent weight of from 1000 to 2000, equivalent weight being the weight of one repeat unit (bearing at least one sulfonic acid group) of the polymer chain. Generally, below an equivalent weight of 1000 the polymer becomes too weak for use in swollen form (and may be soluble), and above 2000 too few sulfonic acid groups are present. The polymers also have sufficiently high molecular weight to be normally solid.

The polymers treated according to the present invention can also be characterized as being linear in the sense that they are composed of a one or two-dimensional network structure which softens upon heating but not the three-dimensional network structure characteristic of crosslinking which does not soften upon heating. Crosslinked polymers which are swellable have their degree of swelling limited by the three dimensional network of chemical bonds present in the polymer, which are not present in the polymers treated according to the present invention. Surprisingly, a high degree of swelling of the linear polymers can be obtained without the polymer losing its integrity and dissolving in the swelling agent. Apparently, the crystallinity of the polymers treated according to the present invention or Van der Waals forces or both act to hold the polymer together. The polymers treated according to the present invention are at least partially crystalline, characterized by a crystallinity index of at least 10. The general procedure for determing crystallinity index for hexogonal packing system is as follows: The polymer is subjected to X-ray analysis scanning the range of the amorphous peak (generally between 5 and 30°), smoothing the data to remove noises, drawing a baseline from the smoothed intensity through the range scanned, determining the area between the baseline and scattering curve, resolving the crystalline peak, and determining the area of this resolved crystalline peak. Then the crystallinity index is 100(crystalline area÷total area), with the total area including a factor to have the crystallinity index be on a scale of from 0 to 100.

By way of example, the crystallinity index of a copolymer represented by Examples 1 to 4 is determined as follows: A 10 mil film of the copolymer is mounted in a Phillips X-ray diffractometer using one degree and .006 inch slits. Data are taken from 6° to 21.6° with copper $K_\alpha$ radiation. The data are smoothed for noise elimination using a seven point polynomial method. The amorphous peak is set at 16.3°, and the area up to 16.3° and above the baseline is considered as half the amorphous area. The baseline is determined by the lowest value of the smoothed intensity at the initial portion of the curve and the baseline is then drawn from that point parallel to the axis. The area between the curve and the baseline from the minimum intensity to 16.3° is taken, multiplied by 2, and assigned as the amorphous area. A line is drawn from the smoothed intensity at 16.3° tangent to the curve on the high angle side of the crystalline peak. The area from 16.3° between this line and the curve is the crystalline area. The crystallinity index is then the Crystalline area÷[crystalline area+0.56 amorphous area]×100

Typically, the polymer treated according to the present invention is a copolymer of a fluorinated ethylene and an ethylenically unsaturated, sulfonic acid-containing monomer. Examples of fluorinated ethylenes are those represented by the formula $CF_2=CX_1X_2$, wherein $X_1$ is H, F, or Cl and $X_2$ is H, F, or a fluoroalkyl group containing 1 to 4 carbon atom, especially $CF_3$. The fluorinated ethylene polymerizes through the vinyl bond. Specific fluorinated ethylenes include tetrafluoroethylene, chlorotrifluoroethylene, and vinylidene fluoride.

The ethylenically unsaturated sulfonic acid is the final identity of the polymer units bearing the $—SO_3H$ groups. Such units need not be formed by starting with a sulfonic acid-containing monomer but can be formed by sulfonation of sulfonation-susceptible moieties of the polymer or by copolymerization of the fluorinated ethylene with its $—SO_3H$ groups in some precursor form. Typical precursor monomers are the fluorocarbon vinyl sulfonyl fluorides represented by the formula $CF_2=CFRSO_2F$, wherein R is a chemical bond or a bifunctional organic group connecting the sulfonyl group to the vinyl group. The copolymerization is through the vinyl group, and after copolymerization, the $—SO_2F$ groups are converted to $—SO_3H$ groups. The R group will generally be a perfluoroalkylene group and may contain one or more ether linkages. Examples of the sulfonyl fluoride monomers include

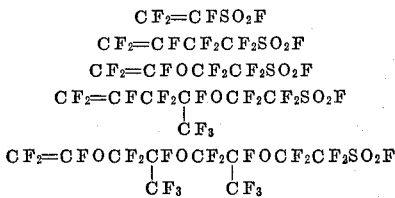

and

The fluorinated ethylene and fluorocarbon vinyl sulfonyl fluoride are copolymerized by conventional polymerization techniques to produce a copolymer in which the sulfonyl fluoride bearing units are randomly interspersed along the copolymer chain. These sulfonyl fluoride groups can be converted to the corresponding sulfonic acid by reacting the copolymer with aqueous base, such as NaOH, to convert the sulfonyl fluoride groups to sulfonate, followed by reacting the sulfonate with a strong inorganic acid such as $H_2SO_4$, to form sulfonic acid groups. The preparation of the sulfonyl fluoride monomers, their copolymerization with fluorinated ethylenes, and conversion of the $—SO_2F$ groups to $—SO_3H$ groups is described in U.S. Patents: 3,301,893 to Putnam et al., 3,041,317 to Gibbs et al., and 3,282,875 to Connolly et al. and in U.S. Patent appplication Ser. Nos. 779,235 to Resnick and 779,273 to Grot, both filed on Nov. 26, 1968.

Additional polymers that can be treated according to the present invention include the graft polymers disclosed in U.S. Pat. 3,257,334 produced by polymerizing a vinyl sulfonic acid in the presence of a fluorocarbon polymer. Examples of such polymers include the graft polymer of a vinyl sulfonic acid, such as styrene sulfonic acid, onto a backbone of polytetrafluoroethylene or polychlorotrifluoroethylene.

Instead of the polymerizing using a sulfonyl-containing monomer, the final polymer can be sulfonated such by reaction with $SO_3$ to obtain sulfonic acid groups pendant from the polymer (backbone or branch therefrom). For example, styrene can be graft polymerized onto a fluorocarbon backbone, followed by sulfonation of the styrene moiety. The resultant sulfonated styrene moiety is considered herein to be an ethylenically unsaturated sulfonic acid.

The swelling agents used according to the present invention include any liquid which reacts with the polymer only to the extent of swelling it and does not dissolve the polymer. In order to swell the polymer, the agent must also wet the polymer. Typically, the swelling agent will have a solubility parameter in the range of from 8 to 23.5 and a hydrogen bonding parameter in the range from 7 to 39.0. The agent may include components which fall outside of these ranges but when mixed with another liquid form a mixture which is a suitable swelling agent and which falls within the solubility and hydrogen bonding parameters set forth. These parameters and an extensive list of agents which are suitable for use as swelling agents in the present invention is disclosed at I. Mellan Compatibility and Solubility, Published by Noyes Development Corporation (1968) e.g., at page 42. Examples of swelling agents useful herein include water, tetramethylene sulfone, dimethyl sulfoxide, phosphoric acid, glycerin, and the alcohols such as n-octyl alcohol, 1,2-ethanediol, 1,2-propanediol, 1,3-propanediol, 1,4-butanediol, and a 10 percent by weight solution of 2,2-dimethyl-1,3-propanediol in water.

The step of contacting the copolymer with liquid swelling agent can be carried out by soaking the polymer in the liquid swelling agent which is at a temperature of at least 110° C. until the desired amount of increase in liquid absorptive capacity is obtained, but preferably until equilibrium is reached, followed by washing to remove the swelling agent, and either drying or immersing the polymer in the liquid to be absorbed into the swollen polymer for a particular application. Alternatively, depending on the liquid used to swell the polymer and on the liquid to be finally absorbed, the washing step can be omitted and the wet, swollen polymer can be immersed in the latter liquid which exchanges itself for the liquid used to swell.

The soaking to swell is carried out at atmospheric pressure if the temperature of soaking (above 110° C.) is less than the boiling point of the swelling agent, or at superatmospheric pressure, such as in an autoclave, when liquids boiling at less than 110° C. are used. The superatmospheric pressures can be the autogenous pressure of the autoclave or to obtain further increased swelling, greater than autogenous pressure can be used, i.e. at least 0.5 kg./cm.² greater. Similarly, when the swelling treatment is carried out at a temperature above 110° C. at which the swelling agent is in the liquid state at atmospheric pressure, the use of at least 0.5 kg./cm.² superatmospheric pressure provides further swelling and increased liquid absorptive capacity of the polymer being treated. The liquid state of the swelling agent can include some of the agent in the vapor state as occurs when the swelling treatment is carried out in a closed system.

The form of the polymer being treated according to the present invention will depend on the manner in which the swollen polymer is to be used. For example, the polymer can be in granular or pellet form for subsequent taking up of liquid catalyst or for maximum exposure of its own sulfonic acid groups for catalytic purposes. The polymer can also be in sheeting form for subsequent take-up of electrolyte for use as a separator in electrochemical cells. In such applications, the increase in liquid absorptive capacity of the polymer for electrolyte increases the effectiveness of the polymer. Although the sulfonic acid groups of the polymer in sheeting form make the sheeting electrically conductive, such conductivity is only about one-tenth that of aqueous electrolyte. The more aqueous electrolyte that the sheeting will take up, the higher is the conductivity of the sheeting, resulting in improved performance in the battery or fuel cell, in which the sheeting is used as a separator between electrodes. The swelling treatment increases the microporosity of the polymer which leads to the applicability of the polymer for ultra filtration and dialysis in any fabricated form desired.

Specific embodiments of the present invention are as follows (parts and percentages are by weight unless otherwise indicated).

EXAMPLE 1

A copolymer of tetrafluoroethylene and perfluoro (3,6-dioxa-4-methyl-7-octenesulfonic acid) having an equivalent weight of 1365 and melt viscosity of $8.3 \times 10^3$ poises at 250° C. was used in this experiment. Sheeting from this copolymer was prepared by skiving 0.012 cm. thick sheets from a block of the copolymer, followed by laminating pairs of these sheets together at 230° C. in a laminating press. Samples of this sheeting were swollen by soaking in water under various conditions, followed by determination of the liquid absorptive capacity in terms of water absorption by the copolymer. Water absorption was measured as an increase in weight from the dry weight of the sheeting, after a first soaking to equilibrium in room temperature water, followed by a second soaking for 10 minutes in boiling water at 100° C. Further details are as follows:

(A) Sheeting which was not previously swollen exhibited water absorption of 16% for the first soak and 25% for the second soak. These soaks in effect swelled the sheeting and showed the small increase in water absorption capacity obtained by increasing the soaking temperature up to the boiling point of water at atmospheric pressure.

(B) Sheeting which was swollen by soaking in boiling water at 100° C. for 30 minutes and not dried prior to absorption testing exhibited water absorption of 26% in both the first and second soak.

(C) Repetition of the experiment of paragraph B, except that the soaking time for swelling was 5 hours, gave water absorption results for both the first and second soak of 27.5%, showing a slight increase in absorption with prolonged soaking to swell.

(D) Repetition of the experiment of paragraph B with room temperature air drying of the sheeting between swelling and absorption testing gave 19% water absorption for the first soak and 26% water absorption for the second soak. The decrease from 26 to 19% in the first soak water absorption (compared with the first soak result in paragraph B) shows that intermediate drying almost erases the gain in water absorptive capacity over the 16% base (paragraph A).

(E) Repetition of the experiment of paragraph B with vacuum drying (63 cm. Hg) at 100° C. for 30 minutes before absorption testing reduced the first soak water absorption test result to 14%. This experiment (first soak) showed that drying at 100° C. made the liquid take-up capacity of the sheeting worse than the non-swollen (non-dried) sheeting of paragraph A. The water absorption test result for the second soak was 25%.

In the experiments of paragraphs B–C, none of the second soak test results was significantly better than the second soak test result for the sheeting of paragraph A.

(F) Sheeting was swollen by soaking for 4 hours in water at 180° C. and 11.2 kg./cm.$^2$ gauge pressure. Without drying, the sheeting was subjected to the first soak test, and the water absorption test result was 98%, a better than three-fold improvement over the experiments of paragraphs A–E. After the sheeting of this paragraph was vacuum dried (at 63 cm. Hg) for 30 minutes at 100° C., the water absorption test result for the second soak was 63%, which shows a permanent charge in the structure of the polymer in the sheeting and which represents a more than two-fold improvement in water absorptive capacity over the sheeting of paragraphs A–E.

EXAMPLE 2

Sheet samples 0.012 cm. thick of a polymer of Example 1 except having an equivalent weight of 1250 and melt viscosity of $3.5 \times 10^3$ poises at 250° C., were swollen by soaking in water at various temperatures and pressures, followed by determination of their water absorptive capacity in terms of water absorbed during the swelling (based on the dry weight of the sheeting). The weight of the swollen sheeting was carried out after it was removed from the autoclave and cooled to room temperature. Following this determination, the resistivities of the samples of sheeting was measured in a cell using platinized platinum electrodes with an exposed sheeting area of 0.322 cm.$^2$ which was previously equilibrated with 40% KOH solution (by soaking). The measurement was made using a Wayne-Kerr Wheatstone bridge at an alternating current of 1592 Hz. Details of the swelling and test results are as follows:

TABLE I

| Sample | Temperature of water, ° C. | Pressure within autoclave [1] | Water absorbed, percent | Resistivity, 40% KOH |
|---|---|---|---|---|
| a | [2] 100 | Atmospheric | 28.2 | 104 |
| b | 150 | 4.9 | 38.8 | 1.08 |
| c | 150 | 35.2 | 86.4 | 0.26 |
| d | 175 | 35.2 | 116.2 | 0.17 |
| e | 175 | [3] 70.3 | 140.8 | 0.12 |
| f | 200 | [3] 352 | 279.3 | 0.07 |
| g | 200 | [3] 703 | 370.0 | 0.06 |
| h | 225 | [3] 703 | 517.7 | 0.06 |

[1] Kept constant throughout run (kg./cm.$^2$ gauge pressure).
[2] Control.
[3] Pressure obtained by an inert gas, i.e. nitrogen or argon.

These results show improved water absorptive capacity with both increasing temperature and pressure and the attendant increased conductivity of the sheeting as evidenced by reduced resistivity.

EXAMPLE 3

Sheeting samples 0.012 cm. thick of the polymer of Example 1 except having an equivalent weight of 1207 and melt viscosity of $2.18 \times 10^3$ poises at 250° C. were soaked in ethylene glycol for an equal time within the range of 10–15 minutes at various temperatures, removed, cooled and placed in 40% KOH solution until take-up of the solution ceased. The temperature of soaking and resistivity measurements on the resultant sheets were as follows:

TABLE II

| Sample | Temperature of ethylene glycol, ° C. | Resistivity, (ohms-cm.$^2$) |
|---|---|---|
| a | 200 | 0.06 |
| b | 155 | 0.10 |
| c | 140 | 0.11 |
| d (control) | Not done | 104 |

The reduced resistivity with increased temperature of soaking reflects the increased absorption by the sheeting of the aqueous KOH electrolyte.

EXAMPLE 4

The procedure of Example 3 was repeated using sheeting samples 0.012 cm. thick of copolymer of equivalent weight of 1237 and melt viscosity of $3.75 \times 10^4$ at 250° C., with each sample being immersed in ethylene glycol for one hour at 200° C. Some of the sheeting samples were then placed in distilled water for leaching out the glycol, followed by immersion in 407 KOH for 4 hours. The resistivity of the resultant sheeting measured 0.38 ohm-cm.$^2$. The remaining sheeting samples were taken from the glycol dip and immersed in 40% KOH without intermediate leaching. This sheeting had a resistivity of 0.29 ohm-cm.$^2$, showing that intermediate leaching of the glycol with water was not necessary.

Similar results were obtained when in place of ethylene glycol as the swelling agent, the following swelling agents were used: 1,2-propanediol, 1,3-propanediol, 1,4-butanediol, n-octyl alcohol, glycerin, and a 10% aqueous solution of 2,2-dimethyl-1,3-propanediol.

The copolymers used in the foregoing examples all had crystallinity indexes in excess of 15%.

EXAMPLE 5

A 0.025 cm. thick film of a polymer of chlorotrifluoroethylene having styrene sulfonic acid groups grafted thereon, an equivalent weight of about 1200, and a crystallinity index in excess of 30, was soaked in boiling water at 100° C. until equilibrium in swelling was reached (about 30 minutes). A portion of this film was subjected to measurement of water absorption, giving the result of 33% (dry film basis). Another portion of the film was boiled in water (100° C.) and then soaked to an equilibrium condition in 40% KOH, and the resistivity measurement on this portion was 0.318 ohm-cm.$^2$. Still another portion of the film was soaked to equilibrium in ethylene glycol at 185° C., with this portion of the film then being cut in half, one half being tested for water content and the other for resistivity, giving the results of 168% and 0.136 ohm-cm.$^2$, respectively. Before the measurements of water content in this example, the film portion involved was soaked in water to leach the glycol and until an equilibrium condition of water absorption was reached.

EXAMPLE 6

The copolymer of Example 3 in the form of 12.7 cm.$^2$ square pieces of film, 0.025 cm. thick was soaked in ethylene glycol (1,2-ethanediol) at 184° C. and atmospheric pressure for 10 minutes. The swollen samples were cooled to room temperature without drying and were then soaked in water to leach out the glycol. The water absorbed during this water soak represented a liquid absorptive capacity of 209% for the copolymer. The copolymer was then dried for 30 minutes at 100° C. under a vacuum of 63 cm. After drying, the polymer was soaked in boiling water at 100° C. for 30 minutes to give a water absorptive capacity of 95%. In contrast when the film samples of this example were boiled in water for 30 minutes at 100° C., the water absorptive capacity of the polymer was only 28%.

As many apparently widely different embodiments of this invention may be made without departing from the spirit and scope thereof, it is to be understood that this invention is not limited to the specific embodiments thereof except as defined in the appended claims.

We claim:
1. A process for increasing the liquid absorptive capacity of linear fluorocarbon sulfonic acid polymer, comprising contacting said polymer with a liquid swelling agent at a temperature of at least 110° C. and immersing said polymer in an aqueous medium when said agent is other than water, the contacting step being carried out for a time sufficient to increase the retained liquid absorptive capacity of said polymer by at least 10 percent greater thant that which results from boiling said polymer in water at 100° C. for 30 minutes, the retained liquid absorptive capacity of said polymer being the liquid absorptive capacity of said polymer after heating at 100° C. for 30 minutes.

2. The process of claim 1 wherein the polymer is in the form of sheeting.

3. The process of claim 1 wherein the contacting is carried out at at least sufficient superatmospheric pressure to maintain the agent in the liquid state.

4. The process of claim 3 wherein the pressure is autogenous pressure.

5. The process of claim 4 wherein the pressure is at least 0.5 kg./cm.$^2$ in excess of said autogenous pressure.

6. The process of claim 1 wherein the agent is ethylene glycol.

7. The process of claim 1 wherein the agent is water.

8. The process of claim 1 wherein the polymer is a copolymer of fluorinated ethylene and an ethylenically unsaturated sulfonic acid.

9. Dry linear fluorocarbon sulfonic acid polymer retaining a liquid absorptive capacity after heating at 100° C. for 30 minutes beyond that which results from boiling the polymer in water at 100° C. for 30 minutes before said heating, the retained liquid absorptive capacity being at least 10 percent greater than resulting from said boiling, the retained liquid absorptive capacity of said polymer having been obtained by contacting said polymer with a liquid swelling agent at a temperature of at least 140° C.

10. The polymer of claim 9 having an equivalent weight of from 1000 to 2000.

11. The process of claim 1 followed by drying said polymer.

12. The polymer of claim 9 as a copolymer of fluorinated ethylene and an ethylenically unsaturated sulfonic acid.

References Cited

UNITED STATES PATENTS

| | | | |
|---|---|---|---|
| 3,492,249 | 1/1970 | Pezarro et al. | 260—2.5 R |
| 2,945,842 | 7/1960 | Eichhorn et al. | 260—79.33 R |
| 3,282,875 | 11/1966 | Connally et al. | 260—79.3 M |
| 3,257,334 | 6/1966 | Chen et al. | 260—884 |

SAMUEL H. BLECH, Primary Examiner

W. J. BRIGGS, SR., Assistant Examiner

U.S. Cl. X.R.

260—2.1, 2.5 M, 29.6 PT, 29.6 F, 29.6 SQ, 30.8 R, 30.6 R, 30.8 DS, 33.4 F, 79.3 M, 79.3 R 79.5 R, 87.5 A, 884